(12) United States Patent
Steffensen et al.

(10) Patent No.: US 6,856,769 B1
(45) Date of Patent: Feb. 15, 2005

(54) OPTICAL TRANSCEIVER MODULE

(75) Inventors: Andreas Steffensen, Kleinmachnow (DE); Mario Festag, Berlin (DE); Christian Carstens, Fahrland (DE); Andreas Stockhausen, Berlin (DE); Roger Miller, San Jose, CA (US)

(73) Assignee: Infineon Technologies AG, Munich (DE)

( * ) Notice: Subject to any disclaimer, the term of this patent is extended or adjusted under 35 U.S.C. 154(b) by 512 days.

(21) Appl. No.: 09/695,511

(22) Filed: Oct. 24, 2000

(51) Int. Cl.[7] .............................. H04B 10/00; G02B 6/36
(52) U.S. Cl. ........................ 398/135; 398/164; 385/94
(58) Field of Search ................................ 398/141, 164, 398/135, 139; 385/88, 92, 94, 134

(56) References Cited

U.S. PATENT DOCUMENTS

| | | | | |
|---|---|---|---|---|
| 5,047,835 A | * | 9/1991 | Chang | 257/433 |
| 5,069,522 A | * | 12/1991 | Block et al. | 385/39 |
| 5,117,476 A | * | 5/1992 | Yingst et al. | 385/88 |
| 5,479,288 A | * | 12/1995 | Ishizuka et al. | 398/164 |
| 5,511,990 A | * | 4/1996 | Klemen | 439/559 |
| 5,528,408 A | * | 6/1996 | McGinley et al. | 398/139 |
| 5,535,034 A | * | 7/1996 | Taniguchi | 398/139 |
| 5,966,487 A | * | 10/1999 | Gilliland et al. | 385/92 |

* cited by examiner

Primary Examiner—M. R. Sedighian
Assistant Examiner—Dalzid Singh
(74) Attorney, Agent, or Firm—Laurence A. Greenberg; Werner H. Stemer; Ralph E. Locher (57) ABSTRACT

An optical transceiver module includes an electro-optical transmission assembly and an electro-optical receiving assembly both mounted on a common printed circuit board and enclosed by a top shell and a bottom shell of an electromagnetically shielding transceiver module. The housing has optical connection openings and an electrical connection opening. The serial optical signals of a first Bit-rate of several Gbit/s and more are converted to serial electrical signals and are multiplexed to parallel electrical signals at a lower second Bit-rate. Reducing the Bit-rate and thus reducing the electromagnetic frequency reduces the risk of electromagnetic interference on the printed circuit main-board. The optical connection openings have a first and a second gasket for reducing the electromagnetic radiation emerging out of the housing through the optical connection openings. The electrical connection opening has a third gasket for reducing the electromagnetic radiation emerging out of the electrical connection opening.

18 Claims, 5 Drawing Sheets

OPTICAL TRANSCEIVER MODULE

BACKGROUND OF THE INVENTION

Field of the Invention

The invention is directed to the field of electro-optic devices and components and, more particularly, to a transceiver module including an optical transmitter and an optical receiver in a single housing minimizing electromagnetic radiation emerging from the enclosures leading to electromagnetic interference (EMI).

In communication applications like Local Area Networks (LAN), Metropolian Area Networks (MAN) and Wide Area Networks (WAN) optical transmitters and receivers are widely used for two way communications. Therefore an optical transmitter and receiver are often combined within one housing defining a so-called optical transceiver module.

Optical LANs shall provide a large number of two-way links to the customer. This is why optical transceiver modules shall desireably be relatively small because a high port density can be achieved in an apparatus employing a large number of transceiver modules. Thus one first desired goal is the miniaturization of optical transceiver modules.

Due to the increasing demand for transmission bandwidth operating Bit-rates for optical networks are increasing steadily. Therefore the electronic circuits of both the optical transmitter and receiver are emitting electromagnetic radiation of higher frequencies as well. Due to the desired miniaturization and to the increasing operating frequencies in the range of several hundred MHz and more, portions of the housing may act like antennas provided the length of the portions matches to the wavelength of the emitted electromagnetic radiation. These antenna-portions of the housing will then re-radiate the electromagnetic waves amplifying the amount of electromagnetic radiation emerging from a transceiver module.

This leads to the problem of electromagnetic interference (EMI) both between the electronic circuits inside the housing of the transceiver module and between the electronic circuits inside the housing and further electronic circuits and devices outside the housing.

Due to existing agency standards regulating the amount of EMI for electronic equipment much attention has to be paid to EMI shielding of such transceivers.

In the art several approaches to solve this problem are proposed. In U.S. Pat. No. 5,047,835 Chang discloses an optical transceiver comprising an EMI shield covering both the electrical circuit of the transmitter and the receiver.

U.S. Pat. No. 5,117,476 to Yingst et al. discloses an optical transceiver including a common horizontally extending circuit board with individual EMI shields over the transmitter and receiver circuit portions.

Taniguchi discloses in U.S. Pat. No. 5,535,034 an optical transceiver capable of preventing any crosstalk from an optical transmitter to an optical receiver comprising a multilayer printed circuit board and two regions that are completely isolated electromagnetically from each other for the transmitter and the receiver respectively.

In the prior art operating optical frequencies are limited in the region of several hundred MHz because after transducing optical signals of higher frequencies in the range of several GHz and more to electrical signals, it becomes technically difficult to avoid large scale electromagnetic interference effects on printed circuit boards.

SUMMARY OF THE INVENTION

It is therefore an object of the present invention to provide an optical transceiver module working at optical data rates in the Gigabit range which combines small and compact dimensions with a high level of EMI-shielding.

Another object of the present invention is to provide a good dissipation of the heat emerging from the electrical circuits inside the transceiver housing.

These and other objects, features and advantages in accordance with the present invention are provided by an optical transceiver module for mounting on a printed circuit mainboard comprising an electro-optical transmission assembly; an electro-optical receiving assembly; multiplexing means for converting parallel electrical signals of a first Bit-rate coming into the transceiver to serial electrical signals of a second Bit-rate for the electro-optical transmission assembly, the first Bit-rate being lower than the second Bit-rate; demultiplexing means for converting serial electrical signals of the second Bit-rate from the electro-optical receiving assembly to parallel electrical signals of the first Bit-rate going out the transceiver; a printed circuit board to carry the electro-optical transmission and receiving assembly and the multiplexing and demultiplexing means; a transceiver housing substantially enclosing the printed circuit board and formed of an electromagnetically shielding material; the electro-optical transmission and receiving assembly each showing a connector portion elongating through optical connection openings of the transceiver housing for connection to optical waveguides; an electrical connector portion of the printed circuit board adjacent to an electrical connection opening of the transceiver housing for the incoming and the outgoing parallel electrical signals of the first Bit-rate; a first and a second gasket to reduce electromagnetic radiation emerging out of the housing through the optical connection openings and to provide a low resistance connection between said transceiver housing and portions of said optical transmission and receiving assembly elongating through said optical connection openings; and a third gasket to reduce electromagnetic radiation out of the housing through the electrical connection opening and to provide a low resistance connection between the housing of the transceiver and the ground potential of the printed circuit main-board onto which the transceiver module is mounted.

In the preferred embodiment the transceiver shows a combined integrated circuit for multiplexing and demultiplexing electrical signals (MUX/DEMUX-IC). The serial data output of the MUX/DEMUX-IC is input to a laser driver IC of the optical transmission assembly. The laser driver IC provides both bias and modulation to a laser diode.

The optical connection portion of the electro-optical transmission assembly may be a single-mode fiber pigtail.

The electro-optical receiving assembly comprises an optical multi-mode fiber pigtail as an optical connection portion, a PIN-diode packaged with a preamplifier (trans-impedance amplifier, PIN-preamp-diode) and a non-limiting postamplifier that quantizes the signal into a digital output.

The transceiver housing is preferably formed of an electromagnetically shielding material like metal. The transceiver housing comprises a top shell and a bottom shell being joined by three EMI-gasket-layers that provide electromagnetically shielding features.

Both the PIN-preamp-diode and the laser diode are mounted in standard TO-housings and fixed side by side along an edge in recesses of the printed circuit board.

The first and the second gasket, which reduce electromagnetic radiation emerging out of the optical connection openings, tightly enclose the TO-housings of the laser diode and the PIN-preamp-diode respectively.

Another aspect of the first and the second gasket is to provide a low resistance connection between the metal TO-housings of the PIN-preamp-diode and the laser diode respectively and the metal housing of the transceiver.

The top shell of the transceiver housing may comprise a plurality of cooling fins for omnidirectional airflow cooling. Furthermore some of the ICs are directly connected to the transceiver housing by a high effective thermal gap filler.

The bottom shell shows a third gasket to reduce electromagnetic radiation emerging from the electrical connection opening of the transceiver housing.

Another aspect of the a third gasket is to provide a low resistance connection between the metal housing of the transceiver and the ground potential of the printed circuit main-board onto which the transceiver module is mounted. Thereby it is inhibited that the transceiver housing becomes an effective antenna re-radiating electromagnetic waves.

BRIEF DESCRIPTION OF THE DRAWINGS

FIG. 4b is a detailed view of the first and second gaskets used to reduce electromagnetic radiation emerging out of the optical connection openings in the alternative embodiment shown in FIG. 4a.

DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and the scope of the invention as defined by the appended claims.

Figure 2:
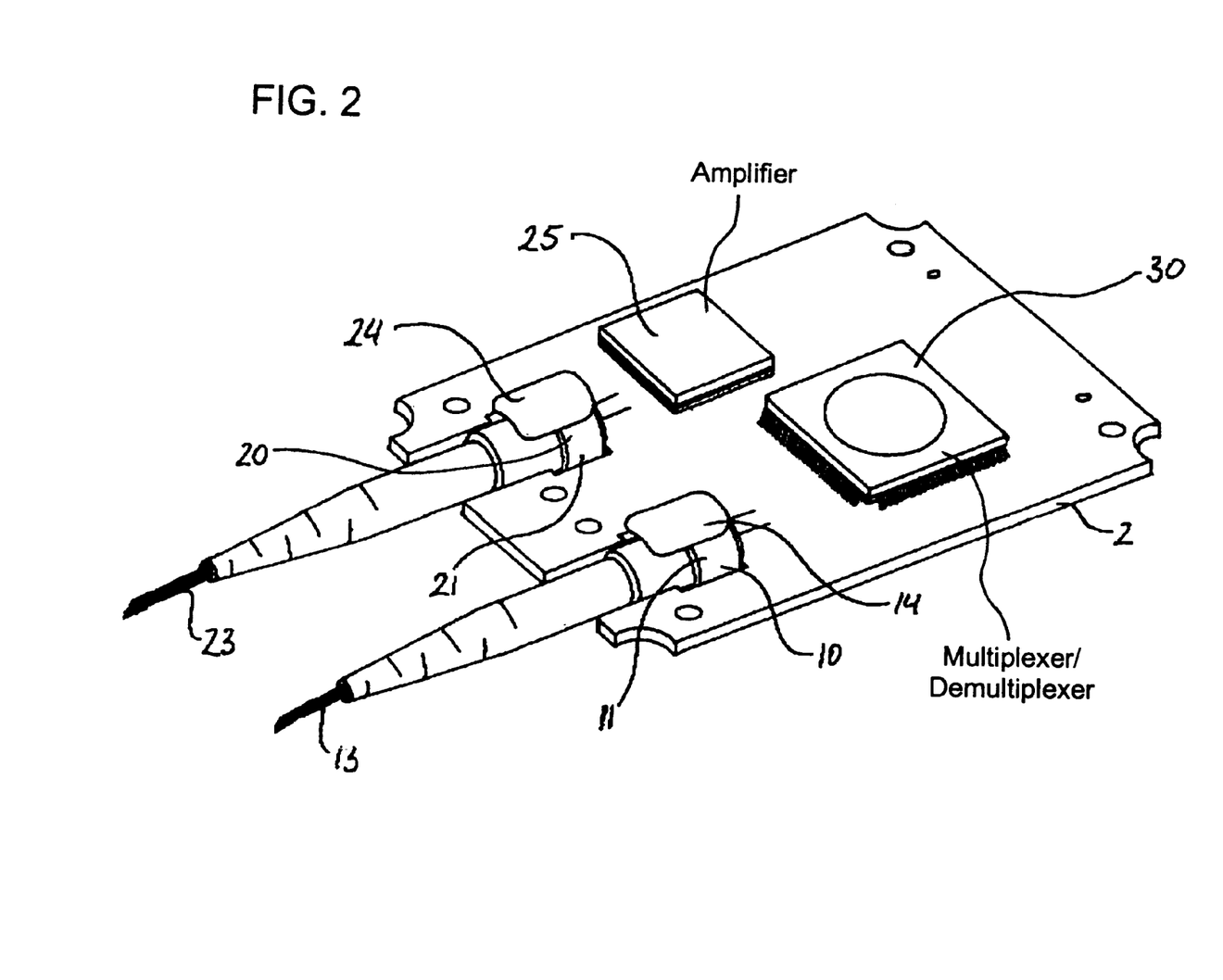
FIG. 2 is a top view of a printed circuit board inside the housing of an optical transceiver module as shown in FIG. 1.

Referring to FIG. 2 the printed circuit board 2 of the transceiver module shows a combined integrated circuit for multiplexing and demultiplexing electrical signals MUX/DEMUX-IC 30.

A four bit wide parallel electrical input signal at a first BIT-rate of 622.08 Mbit/s is accepted by the MUX/DEMUX-IC 30 being synchronous with an incoming parallel clock. The parallel clock is used to load the data into an input latch of the MUX/DEMUX-IC 30. An incoming reference clock which need not be synchronous with the incoming parallel data or clock, is used to clock a Parallel-to-Serial-Converter of the MUX/DEMUX-IC 30.

The serial data output of the MUX/DEMUX-IC 30 at a second BIT-rate of about 2.5 Gbit/s is input to a laser driver IC 15. The laser driver IC 15 provides both bias and modulation to a laser diode 10. The laser bias current is controlled by a closed-loop circuit, which regulates the output average power of the laser diode 10 over conditions of temperature and aging. A monitor PIN— or avalanche-photdiode that is built mechanically into the laser diode 10, provides feedback signal to the laser driver 15, and prevents the laser power from exceeding the factory preset operating limits.

The laser diode 10 is a Fabry-Perot or DFB (distributed feedback) type, which will emit light at wavelengths centered preferably about 1310 nm or 1550 nm.

Figure 1:
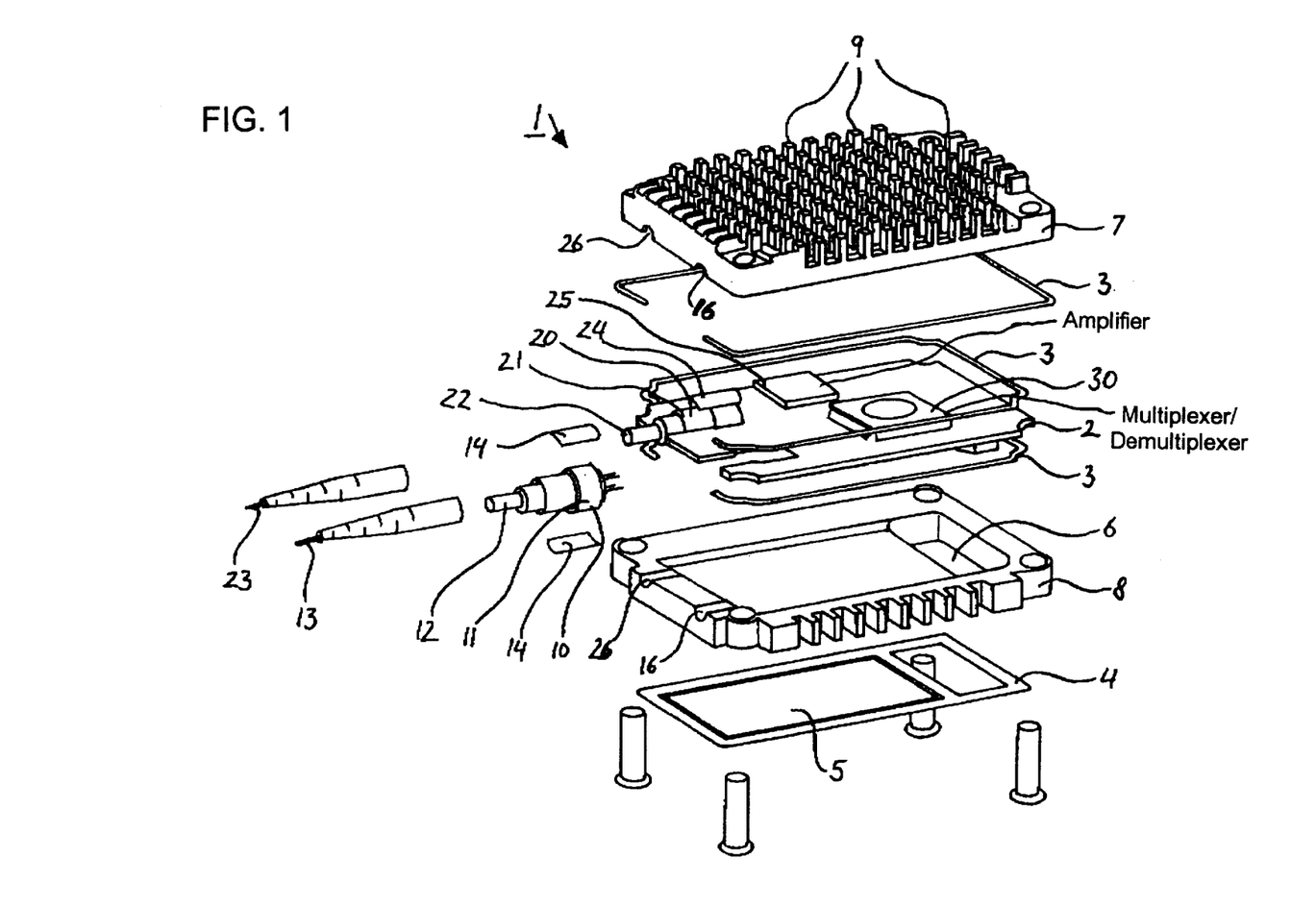
FIG. 1 is an explosive view of an optical transceiver module in accordance with the present invention.

As shown in the explosive view of FIG. 1 the optical connection portion of the electro-optical transmission assembly shows a single-mode fiber pigtail 12, which is preferably terminated in an LC/PC 0°, SC/PC, PC/PC or other optical connector for an optical output fibre cable 13.

The optical connection portion of the electro-optical receiving assembly is provided as an optical multi-mode fiber pigtail 22 preferably terminated in an LC/PC 0°, SC/PC, FC/PC or other optical connector for an optical input fibre cable 23.

As seen in FIG. 2 the electro-optical receiving assembly comprises a PIN-preamp-diode 20 packaged with a preamplifier (trans-impedance amplifier) and a non-limiting postamplifier-IC 25 that quantizes the signal into a digital output.

In order to recover the high speed clock from the incoming serial data a Clock Data Recovery unit is provided packaged with the postamplifier-IC 25. The data and clock are applied to the MUX/DEMUX-IC 30, which demultiplexes the serial electrical data of the second BIT-rate into a 4-bit wide parallel format at the first BIT-rate.

A free running crystal clock oscillator 31 is mounted on the bottom side of the printed circuit board 2. The oscillator supplies a clock to the Clock Data Recovery IC 25, which allows the Clock Data Recovery IC to output a valid clock signal in the event that the incoming optical signal through the optical input fibre cable 23 is interrupted.

As shown in FIG. 1 the transceiver housing is preferably formed of an electromagnetically shielding material like metal. It comprises a top shell 7 and a bottom shell 8 being joined by three EMI-gasket-layers 3 that provide electromagnetically shielding features. These EMI-gasket-layers 3 may either be made of a plastic toil loaded with Carbon-, Silver- or Nickel-particles or of a plastic paste loaded with Carbon-, Silver- or Nickel-particles. The printed circuit board 2 electrically makes contact through the EMI-gasket to the top shell and the bottom shell of the transceiver housing by one EMI-gasket-layer 3 on the top plane of the printed circuit board 2 and one EMI-gasket-layer 3 on the bottom plane respectively.

Figure 3:
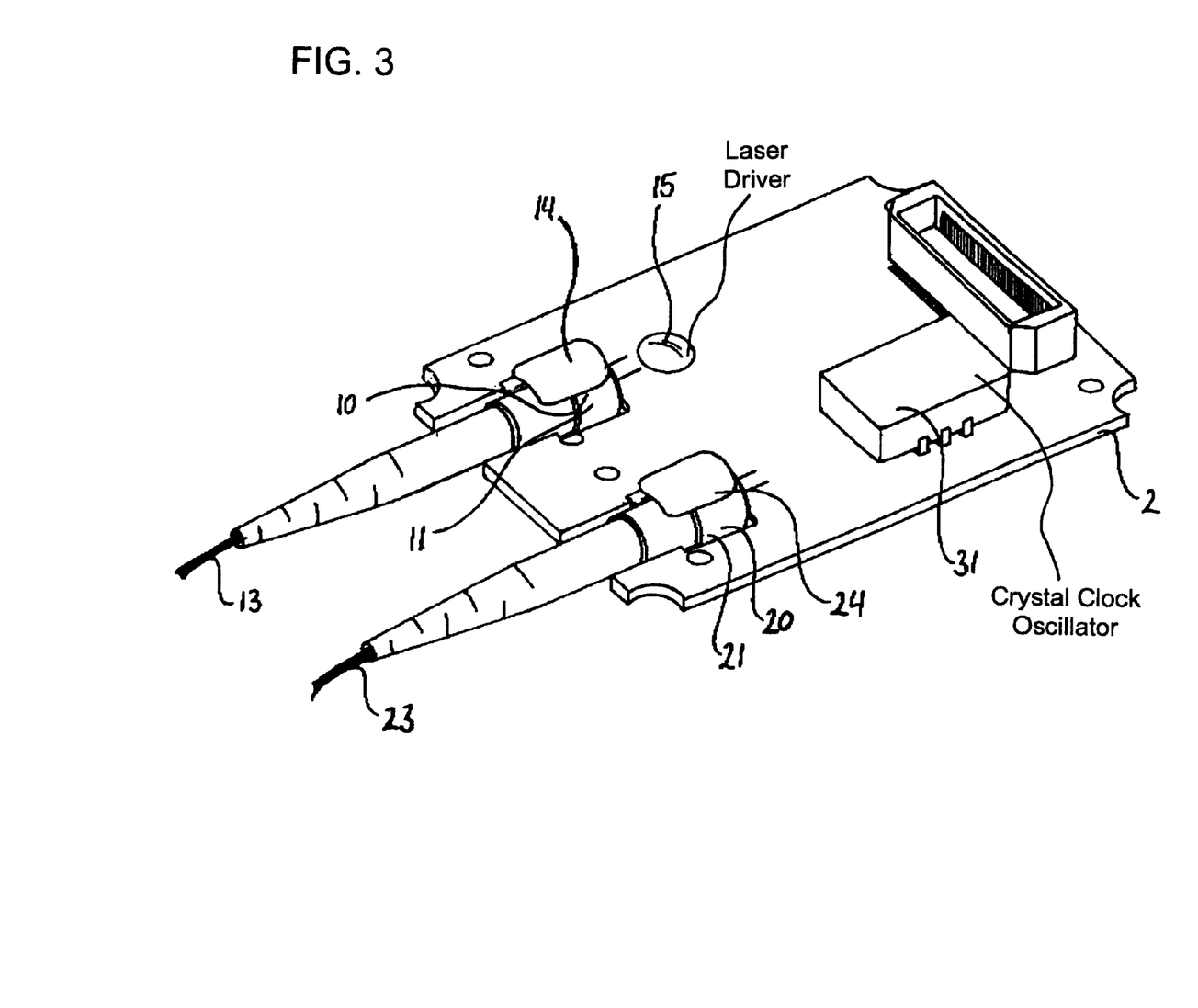
FIG. 3 is a bottom view of a printed circuit board inside the housing of an optical transceiver module as shown in FIG. 1.

Referring to FIG. 2 and FIG. 3 both the PIN-preamp-diode 20 and the laser diode 10 are mounted in standard TO-housings 11, 22 and fixed side by side in recesses along an edge of the printed circuit board 2. Therefore PIN-preamp-diode 20 and laser diode 10 show a portion on top of the printed circuit board 2 and a portion on bottom of the printed circuit board 2.

The first gasket 14 and the second gasket 24, which reduce electromagnetic radiation emerging out of the optical connection openings 16, 26, tightly enclose the TO housings 11, 21 of the laser diode 10 and the PIN-preamp-diode 20 respectively forming a tube or a portion of a tube along the optical waveguide leading out of the transceiver housing.

The tube or tube portion behaves like a waveguide for electromagnetic waves showing a characteristic cut-off frequency depending upon its diameter. Frequencies lower than the cut-off frequency cannot readily excite the tube- or tube-portion-waveguide and therefore cannot emerge from the transceiver housing. The diameter of this tube- or tube-portion-waveguide does preferably not exceed a few millimeters in order to provide a high cut-off frequency in the GHz range.

Another aspect of the first gasket 14 and the second gasket 24 is to provide a low resistance connection between the metal TO-housings 11, 21 of PIN-preamp-diode 20 and laser diode 10 respectively and the metal top shell 7 and bottom shell 8 of the transceiver housing. By that way the potential of the TO-housings 11, 21 of the laser diode 10 and the PIN-preamp-diode 20 are kept constantly at the ground potential of the transceiver housing preventing formation of electrical fields.

There are three different ways to provide the first gasket 14 and the second gasket 24.

Referring to FIG. 1 the first solution is to form tube-like optical connection openings 16, 26 directly into the top shell 7 and bottom shell 8 of the metal-transceiver housing. To achieve the above mentioned features it is crucial that the diameter of the optical connection openings 16, 26 matches precisely to the diameter of the TO-housings 11, 21 of the PIN-preamp-diode 20 and the laser diode 10 respectively. The electrical contact between the TO-housings 11, 21 and the top shell 7 and the bottom shell 8 of the transceiver housing are provided by an EMI-foam or a wire mesh.

Figure 4A:
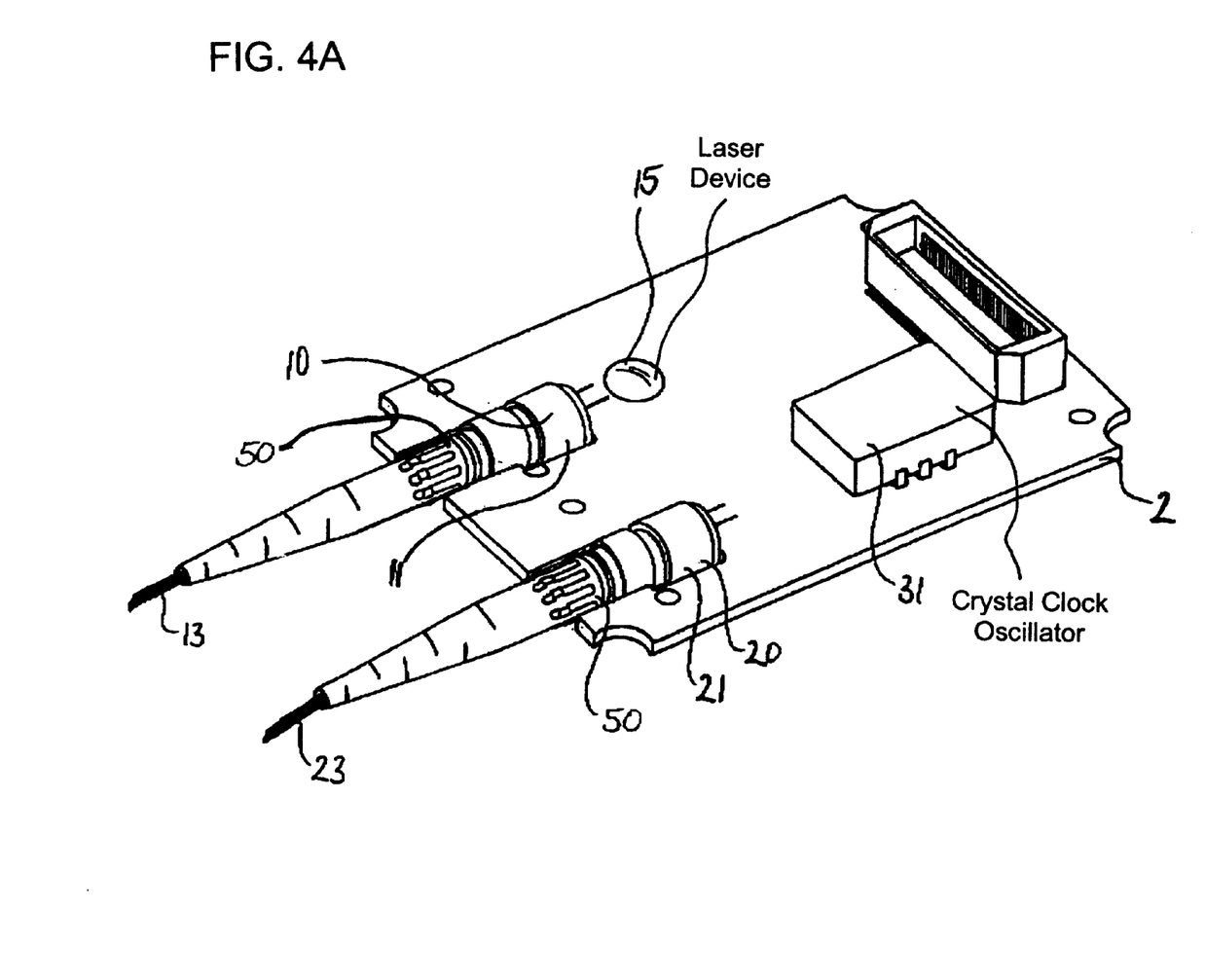
FIG. 4a is a bottom view of an alternative embodiment of a printed circuit board inside the housing of an optical transceiver module as shown in FIG. 1.

Referring to FIG. 4a in the second solution adjacent to the TO-housings 11, 21 the PIN-preamp-diode 20 and the laser diode 10 respectively show metal contact means 50 that are squeezed in the optical connection openings 16, 26 of top shell 7 and bottom shell 8 of the transceiver housing forming a tube or a tube portion showing the above mentioned features of an electromagnetic waveguide.

Figure 4B:
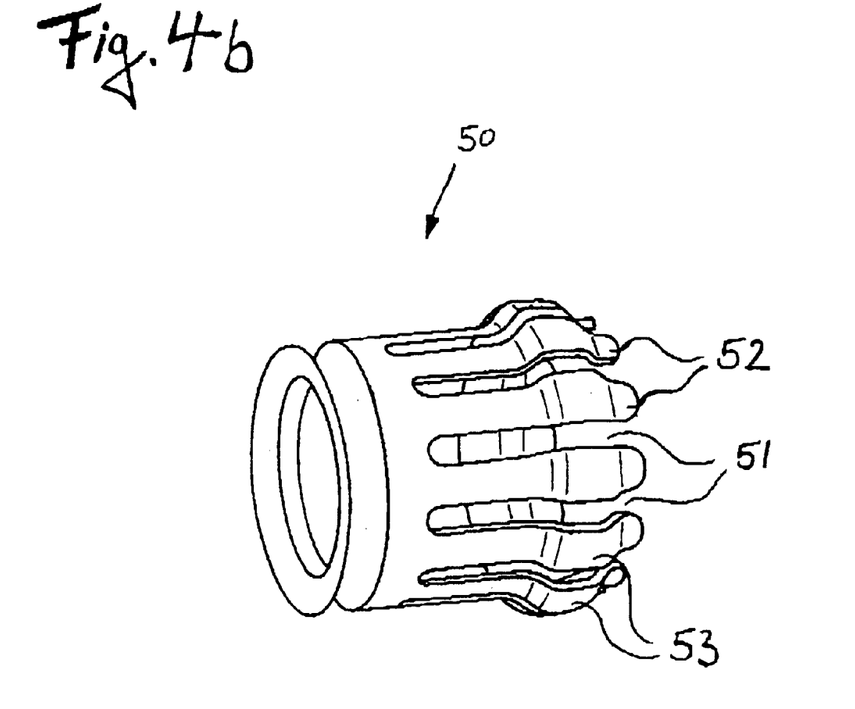

Referring to FIG. 4b the metal contact means 50 used in FIG. 4a have the shape of a hollow cylinder. The end of the hollow cylinder that is arranged towards the optical waveguides 13, 23 show a plurality of cutouts 51 being equally spaced around the circumference of the cylinder. The cutouts 51 elongate axially along more than half the axial length of the hollow cylinder. Thereby the plurality of cutouts 51 form a plurality of finger-like tines 52 being arranged equally spaced around the circumference of the cylinder. Due to their length the finger-like tines 52 can be bent elastically in a radial direction. Close to their free end each of the finger-like tines 52 show a portion 53 that is radially outwardly combered. These combered portions 53 contact the top shell 7 and bottom shell 8 of the transceiver housing, the finger-like tines 52 being squeezed radially inwardly in the optical connection openings 16, 26.

Referring to FIGS. 1, 2 and 3 in the third solution the first gasket 14 and the second gasket 24 are made of two pieces of plastic foil 14, 24 loaded with Carbon-, Silver- or Nickel-particles being wrapped around the top-portion and the bottom portion of the TO-housings 11, 21 of the PIN-preamp-diode 20 and the laser diode 10. Thereby the plastic foils 14, 24 form a tubular jacket that is tightly enclosed by the optical connection openings 16, 26 of the top shell 7 and the bottom shell 8 of the transceiver housing showing the above mentioned electromagnetic waveguide features.

According to FIG. 1 the top shell 7 of the transceiver housing may comprise a plurality of cooling fins 9 for omnidirectional airflow cooling. Furthermore the MUX/DEMUX-IC 30 the Postamplifier-IC 25 and the clock oscillator IC 31 are directly connected to the top shell 7 and bottom shell a respectively by a high effective thermal gap filler.

The bottom shell 8 of the transceiver housing shows a heat transfer pad 5 that is preferably formed of a heat conductive foil. This heat transfer pad 5 is arranged from outside the transceiver housing under its bottom shell 8 having mechanical contact with the bottom shell 8 of, the transceiver housing and the printed circuit main-board onto which the transceiver module 1 is mounted.

Furthermore the bottom shell 8 shows a third gasket 4 to reduce electromagnetic radiation emerging from the electrical connection opening 6 of the bottom shell 8 of the transceiver housing. The third gasket 4 is preferably made of a plastic foil loaded with Carbon-, Silver- or Nickel-particles having the shape of two frames being joined along one common edge, one frame enclosing the edges of the electrical connection opening 6 and the other frame covering the edge portion of the bottom shell 8.

Another aspect of the third gasket 4 is to provide a low resistance connection between the metal housing of the transceiver module 1 and the ground potential of the printed circuit main-board onto which the transceiver module 1 is mounted. By the frame-like shape of the third gasket 4 along the edges of the bottom shell 8, a reliable grounding of the transceiver housing is provided to inhibit the transceiver housing from becoming an effective antenna re-radiating electromagnetic waves. Therefore it is necessary to have a proper contact between the transceiver module and the printed circuit main-board e.g. by screws which can be installed through the mounting holes 17.

The foregoing descriptions of specific embodiments of the present invention have been presented for purposes of illustration and description. They are not intended to be exhaustive or to limit the invention to the precise forms disclosed and obviously many modifications and variations are possible in light of the above teaching. The embodiments were chosen and described to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

We claim:

1. An optical transceiver module for electrical connection to an electrical circuit, for optical connection to an optical data network, and for mounting on a main printed circuit board, the transceiver comprising:
   an electro-optical transmission assembly having a connector portion for connection to an optical waveguide;
   an electro-optical receiving assembly having a connector portion for connection to an optical waveguide;
   a multiplexing device for converting received parallel electrical signals of a first Bit-rate to serial electrical signals of a second Bit-rate for said electro-optical transmission assembly, said first Bit-rate being lower than said second Bit-rate;
   a demultiplexing device for converting serial electrical signals of said second Bit-rate from said electro-optical receiving assembly to parallel electrical signals of said first Bit-rate for transmission;
   a printed circuit board having an electrical connector portion for receiving the parallel electrical signals for said multiplexing device and for transmitting the parallel electrical signals from said demultiplexing device, said printed circuit board carrying said electro-optical transmission assembly, said electro-optical receiving assembly, said multiplexing device, and said demultiplexing device;

a transceiver housing for mounting on a main printed circuit board having a ground connection for a ground potential, said housing formed of an electromagnetically shielding material, said housing substantially enclosing said printed circuit board, said housing formed with a first optical connection opening, a second optical connection opening, and an electrical connection opening located adjacent said electrical connector portion of said printed circuit board, said connector portion of said electro-optical transmission assembly extending through said first optical connection opening, said connector portion of said electro-optical receiving assembly extending through said second optical connection opening, said housing having a top-shell, a bottom shell, and a material joining said top shell and said bottom shell, said material selected from the group consisting of a paste providing electromagnetically shielding features and a foil providing electromagnetically shielding features;

a first gasket for reducing electromagnetic radiation emerging out of said housing through said first optical connection opening, said first gasket providing a low resistance connection between said housing and a first component extending through said first optical connection opening, said component including said connector portion of said electro-optical transmission assembly;

a second gasket for reducing electromagnetic radiation emerging out of said housing through said second optical connection opening, said second gasket providing a low resistance connection between said housing and a second component extending through said second optical connection opening, said second component including said connector portion of said electro-optical receiving assembly; and a third gasket for reducing electromagnetic radiation emerging out of said housing through said electrical connection opening, said third gasket for providing a low resistance connection between said housing and the ground connection of the main printed circuit board.

2. The optical transceiver module according to claim 1, wherein said electro-optical transmission assembly includes;

a standard TO-housing including a laser diode for providing an output power;

an integrated circuit including a laser driver for providing both bias and modulation of said laser diode; and a diode providing a signal to said laser driver for closed-loop control of the output power of said laser diode, said signal providing diode selected from the group consisting of a monitor PIN-diode and an avalanche photodiode.

3. The optical transceiver module according to claim 2, wherein said laser diode includes a single mode fiber pigtail and is selected from the group consisting of a Fabry-Perot laser diode and a DFB type laser diode.

4. The optical transceiver module according to claim 1, wherein said connector portion of said electro-optical transmission assembly is a connector selected from the group consisting of a LC/PC 0° connector, a SC/PC connector, and a FC/PC connector.

5. The optical transceiver module according to claim 1, wherein said electro-optical receiving assembly includes:

a standard TO-housing including a PIN-diode, a transimpedance amplifier providing an electrical signal, and a multi-mode fiber pigtail; and an integrated circuit including a clock data recovery unit and a postamplifier for quantizing the received electrical signals into a digital output.

6. The optical transceiver module according to claim 5, wherein said connector portion of said electro-optical receiving assembly is a connector selected from the group consisting of a LC/PC 0° connector, a SC/PC connector, and a FC/PC connector.

7. The optical transceiver module according to claim 1, comprising a single integrated circuit including said multiplexing device and said demultiplexing device.

8. The optical transceiver module according to claim 1, comprising:

an integrated circuit including a phase locked clock oscillator for providing a parallel clock signal;

said single integrated circuit accept ng a four bit wide parallel electrical input signal at the first BIT-rate, the first bit rate being 622.08 Mbit/s and being synchronous with the parallel clock signal of said phase locked clock oscillator and a reference clock input signal.

9. The optical transceiver module according to claim 1, comprising:

a material fixing said printed circuit board to said top shell and to said bottom shell;

said material selected from the group consisting of a paste providing electromagnetically shielding features and a foil providing electromagnetically shielding features.

10. The optical transceiver module according to claim 9, comprising a highly effective thermal gap filler that directly connects said housing to:

said single integrated circuit that includes said multiplexing device and said demultiplexing device;

said integrated circuit that includes said postamplifier; and said integrated circuit that includes said clock oscillator.

11. The optical transceiver module according to claim 10, wherein said top shell includes a plurality of cooling fins for omnidirectional airflow cooling.

12. The optical transceiver module according to claim 11, wherein:

said bottom shell is formed with said electrical connection opening;

said bottom shell has an edge region near said electrical connection opening and has another edge region;

said third gasket has a shape that includes a common edge and two frames joined at said common edge; and said third gasket encloses said edge region near said electrical connection opening and covers said other edge region of said bottom shell.

13. The optical transceiver module according to claim 1, comprising:

a connection device for mounting said housing to the main printed circuit board:

said connection device providing conductive contact between said third gasket and the ground connection of the main printed circuit board.

14. The optical transceiver module according to claim 1, comprising:

a heat transfer pad for positioning between said bottom shell and the main printed circuit board;

said heat transfer pad mechanically contacting said edge region near said electrical connection opening and not mechanically contacting said other edge region of said bottom shell.

15. The optical transceiver module according to claim 14, wherein:

said first gasket includes a metal contacting device forming a tubular structure when squeezed between said housing and said TO-housing of said laser diode; and said second gasket includes a metal contacting device forming a tubular structure when squeezed between said housing and said TO-housing of said PIN-diode.

16. The optical transceiver module according to claim 15, wherein:

said metal contacting device formed by said first gasket and said metal contacting device formed by said second gasket each define a respective hollow cylinder shaped structure having an axial length, a circumference, and an end;

said hollow cylinder is formed with a plurality of cutouts axially elongated along more than half of said axial length;

said plurality of said cutouts are equally spaced around said circumference of said hollow cylinder and define a plurality of finger-like tines therebetween, said plurality of said finger-like tines are equally spaced around said circumference of said hollow cylinder; and each one of said plurality of said tines has a free end and a portion that is radially, outwardly combered, said combered portion being near said free end.

17. The optical transceiver module according to claim 1, wherein:

said first gasket includes two pieces of electromagnetically shielding plastic foil in a tubular shape that enclose said TO-housing of said laser diode; and said second gasket includes two pieces of electromagnetically shielding plastic foil in a tubular shape that enclose said TO-housing of said laser diode PIN-preamp-diode.

18. The optical transceiver module according to claim 1, comprising:

an electrically conductive material selected from the group consisting of a wire mesh and a conductive foam;

said first optical connection opening of said transceiver housing is formed with tube-like shape and said shape of said first optical connection opening defines said first gasket;

said second optical connection opening of said transceiver housing is formed with tube-like shape and said shape of said second optical connection opening defines said second gasket;

said first optical connection opening enclosing said TO-housing of said laser diode;

said electrically conductive material electrically connecting said TO-housing of said laser diode to said transceiver housing;

said second optical connection opening enclosing said TO-housing of said PIN-diode; and said electrically conductive material electrically connecting said TO-housing of said PIN-diode to said transceiver housing.

* * * * *